United States Patent [19]
Afsar et al.

[11] Patent Number: 5,751,946
[45] Date of Patent: May 12, 1998

[54] METHOD AND SYSTEM FOR DETECTING BYPASS ERROR CONDITIONS IN A LOAD/STORE UNIT OF A SUPERSCALAR PROCESSOR

[75] Inventors: Muhammad Afsar; Christopher Anthony Freymuth, both of Austin, Tex.

[73] Assignee: International Business Machines Corporation, Armonk, N.Y.

[21] Appl. No.: 588,183

[22] Filed: Jan. 18, 1996

[51] Int. Cl.$^6$ ..................................... G06F 11/28
[52] U.S. Cl. ..................... 395/185.03; 395/185.04
[58] Field of Search ................ 395/185.03, 185.04, 395/185.02

[56] References Cited

U.S. PATENT DOCUMENTS

| | | | |
|---|---|---|---|
| 4,722,049 | 1/1988 | Lahti | 364/200 |
| 4,991,090 | 2/1991 | Emma et al. | 364/200 |
| 5,151,981 | 9/1992 | Westcott et al. | 395/185.03 |
| 5,185,871 | 2/1993 | Frey et al. | 395/375 |
| 5,193,167 | 3/1993 | Sites et al. | 395/425 |
| 5,261,071 | 11/1993 | Lyon | 395/425 |
| 5,420,990 | 5/1995 | McKeen et al. | 395/375 |
| 5,467,473 | 11/1995 | Kahle et al. | 395/800 |
| 5,557,763 | 9/1996 | Senter et al. | 395/375 |
| 5,577,200 | 11/1996 | Abramson et al. | 395/185.03 |
| 5,625,835 | 4/1997 | Ebcioglu et al. | 395/800 |
| 5,644,779 | 7/1997 | Song | 395/800 |
| 5,655,141 | 8/1997 | Ogden et al. | 395/800.23 |
| 5,678,016 | 10/1997 | Eisen et al. | 395/392 |

*Primary Examiner*—Robert W. Beausoliel, Jr.
*Assistant Examiner*—Scott T. Baderman
*Attorney, Agent, or Firm*—Sawyer & Associates; Mark E. McBurney

[57] ABSTRACT

A method for detecting bypass error conditions in a load/store unit of a superscalar processor includes determining whether a load instruction has executed out-of-order with respect to an executing store instruction when a real address to a word boundary of the load instruction and a real address to a word boundary of the executing store instruction match, and identifying a bypass error condition for the load instruction when the load instruction has executed out-of-order with respect to the executing store instruction. In a system aspect, the system includes a load queue, detection logic, and completion logic. The load queue includes a real page number buffer for storing a real address to a word boundary for each executed load instruction. The detection logic compares real addresses to a word boundary for a load instruction against an executing store instruction and compares a program order of the load instruction and the executing store instruction when the real addresses to a word boundary match. The completion logic receives the executing store instruction and a bypass error signal when the load instruction has executed out-of-order with respect to the executing store instruction. The completion logic also receives the identifier of the load instruction which bypassed the executing store instruction.

10 Claims, 6 Drawing Sheets

| Cycle #0 | Cycle #1 | Cycle #2 | Cycle #3 | Cycle #4 | Cycle #5 | Cycle #6 |
|---|---|---|---|---|---|---|
| Fetch A,B,C,D | Fetch E,F,G,H | Dispatch E,F,G,H | | | | |
| | Dispatch A,B,C,D | Execute A,B,C,D | Execute B,C,E,F | Execute E,F,G,H | | |
| | | | Finish A,D | Finish B,C | Finish E,F,G,H | |
| | | | | Complete A,D | Complete B,C | Complete E,F,G,H |

FIG. 2

| Instruction # | Command | Address | Cycle Completed |
|---|---|---|---|
| 1 | Load | 1 | 1 |
| 2 | Store | 2 | 1 |
| 3 | Add | 3 | 1 |
| 4 | Load | 4 | 2 |
| 5 | Load | 5 | 2 |
| 6 | Store | 6 | 2 |
| 7 | Add | 7 | 2 |
| 8 | Load | 6 | 3 |

FIG. 4

| Instruction # | Command | Address | Cycle Completed |
|---|---|---|---|
| 1 | Load | 1 | 1 |
| 2 | Store | 2 | 1 |
| 3 | Add | 3 | 1 |
| 4 | Load | 4 | 1 |
| 5 | Load | 5 | 1 |
| 6 | Store | 6 | 1 |
| 7 | Add | 7 | 1 |
| 8 | Load | 8 | 1 |
| 9 | Load | 6 | 2 |

FIG. 5

METHOD AND SYSTEM FOR DETECTING BYPASS ERROR CONDITIONS IN A LOAD/STORE UNIT OF A SUPERSCALAR PROCESSOR

FIELD OF THE INVENTION

The present invention relates to superscalar processors, and more particularly to detection of bypass error conditions from out-of-order execution within a load/store unit of a superscalar processor.

BACKGROUND OF THE INVENTION

In the continuing development of faster and more powerful computer systems, a significant type of microprocessor has been utilized, known as a reduced instruction set computer (RISC) processor. Increased advances in the field of RISC processors have led to the development of superscalar processors. Superscalar processors, as their name implies, perform functions not commonly found in traditional scalar microprocessors. Included in these functions is the ability to execute instructions out-of-order with respect to the program order. Of course, the results of the executions appear to have occurred in program order, even though the instructions occur out-of-order, so that proper data coherency is maintained.

While out-of-order execution is typically known to increase processor performance, certain problems exist that restrict the use of out-of-order execution under some circumstances. Included in these problems are coherency issues for a system's data cache.

For example, when executing load instructions out-of-order with respect to store instructions, a load instruction may address the same data cache location as a store instruction, causing incorrect data to be received. Thus, when a later load instruction bypasses an earlier store instruction, the earlier load instruction may get older data than it should have received, if the original program order had been strictly followed. Such problems are commonly referred to as bypass errors. A key function for maintaining proper processor performance, therefore, is the detection of such bypass errors at an appropriate time.

Accordingly, a need exist that allows effective detection of bypass errors within a superscalar processor without decreasing performance.

SUMMARY OF THE INVENTION

The present invention meets such a need and provides system and method aspects for detecting bypass error conditions for a load instruction executing out-of-order with respect to a store instruction in a load/store unit of a superscalar processor.

In a method aspect, the present invention includes the step of determining whether a load instruction has executed out-of-order with respect to an executing store instruction when a real address to a word boundary of the load instruction and a real address to a word boundary of the executing store instruction match. The method further includes identifying a bypass error condition for the load instruction when the load instruction has executed out-of-order with respect to the executing store instruction.

Other aspects of the method of the present invention include determining a program order for the load instruction and the executing store instruction.

In a system aspect of the present invention, the system includes a load queue, detection logic, and completion logic.

The load queue includes a real page number buffer for storing a real address to a word boundary for each load instruction in the load queue. The detection logic, coupled to the load queue, compares a real address to a word boundary for a load instruction in the load queue against a real address to a word boundary of an executing store instruction. Further, the detection logic compares a program order of the load instruction and the executing store instruction identifier when the real addresses to a word boundary match. The completion logic, coupled to the load/store unit, receives the executing store instruction identifier and a bypass error signal when the load instruction has executed out-of-order with respect to the executing store instruction.

In a further aspect, the completion logic receives an instruction identifier for the load instruction. Additionally, the completion logic completes instructions up to the identified load instruction.

With the present invention, possible occurrences of bypass error conditions are identified at the time of execution of a store instruction. The bypass condition and an instruction identifier for the bypassing instruction are then effectively utilized by the completion logic to allow other instructions to execute, up to the load instruction with the bypass error. Such effective utilization improves the overall performance of the processor.

These and other advantages of the aspects of the present invention will be more fully understood in conjunction with the following detailed description and accompanying drawings.

BRIEF DESCRIPTION OF THE DRAWINGS

FIG. 2 illustrates a basic timing diagram of five instruction cycles, as applied to a four-dispatch type of processor.

FIG. 4 represents a sequence of instructions, the memory addresses they access, and the cycle in which they can be completed in a prior art configuration.

FIG. 5 represents a sequence of instructions, the memory addresses they access, and the cycle in which they can be completed in accordance with the present invention.

DETAILED DESCRIPTION

The present invention relates to detection of bypass errors in a superscalar processor. The following description is presented to enable one of ordinary skill in the art to make and use the invention and is provided in the context of a patent application and its requirements. Various modifications to the preferred embodiment and the generic principles and features described herein will be readily apparent to those skilled in the art.

It should be appreciated that the present invention is described herein in terms of a superscalar processor that allows out-of-order execution within and across functional units of a superscalar processor. One suitable such processor is the PowerPC™ 620, to be available from IBM Corporation, Austin, Tex. Although the description refers to the functions of this processor, the features of the present invention may be used with other similar processors that require the same types of detection and correction capabilities. Accordingly, the following is to be considered descriptive and not restrictive of the present invention.

Figure 1:
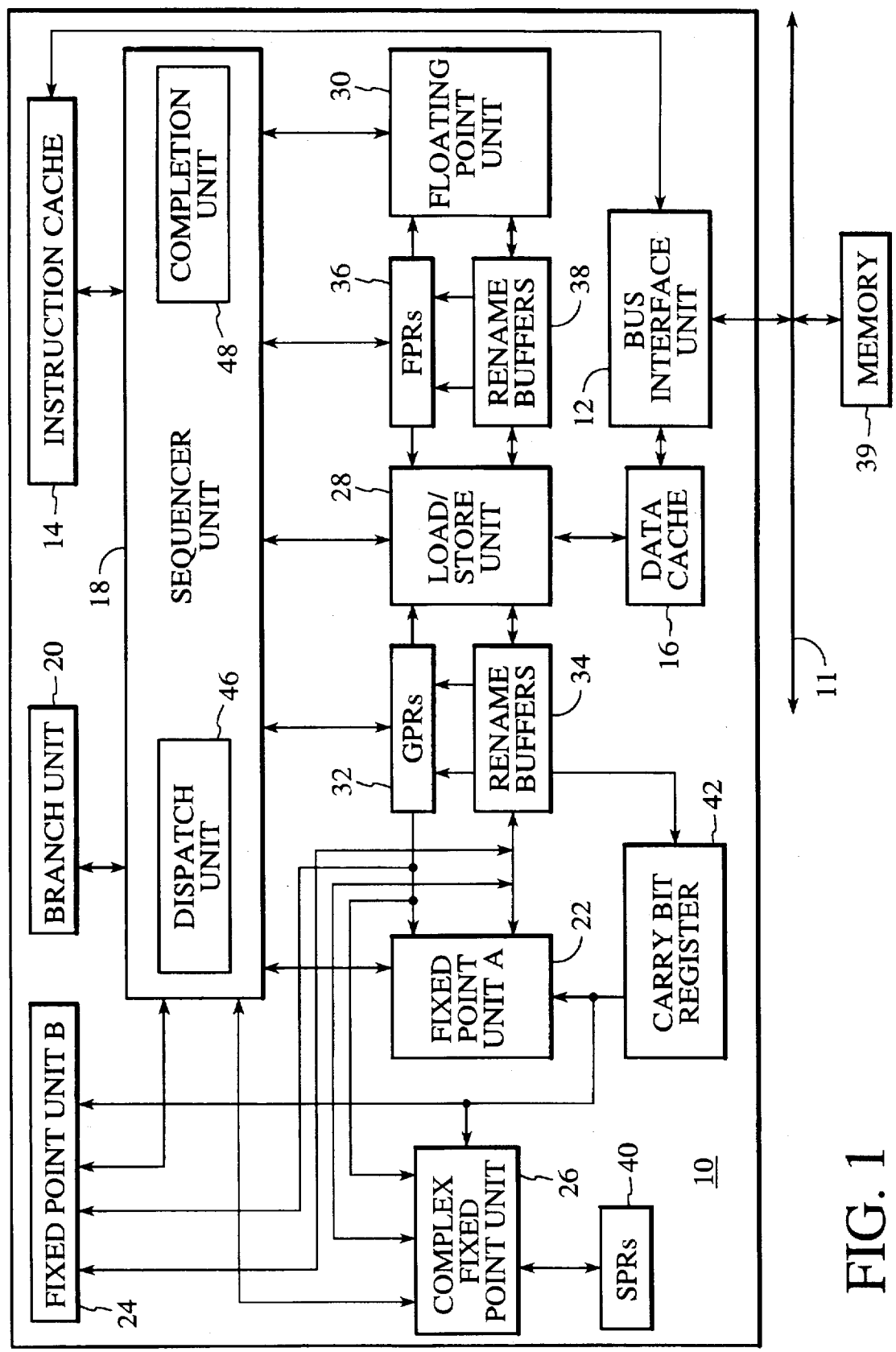
FIG. 1 illustrates a block diagram of a computer system in accordance with the present invention.

An overall block diagram of such a superscalar processor is shown in FIG. 1. As shown, superscalar processor systems typically include a system bus 11 connected to a bus interface unit ("BIU") 12 of a processor 10. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40. FPU 30 inputs its source operand information from floating point architectural registers ("FPRs") 36 and floating point rename buffers 38. FPU 30 outputs results (destination operand information) of its operation for storage at selected entries in floating point rename buffers 38. A further description of the processor 10 is suitably included in co-pending U.S. patent application, Ser. No. 08/537,586, filed Oct. 2, 1995 entitled A Method and System for Performance Monitoring through Identification of Frequency and Length of Time of Execution of Serialization Instructions in a Processing System, and assigned to the assignee of the present invention.

In a superscalar processor, such as the PowerPC™620, five basic cycles occur for instruction processing. These five cycles include fetch, dispatch, execution, finish, and completion. For purposes of this discussion, a fetch cycle preferably refers to instruction fetch from an instruction cache; a dispatch cycle preferably refers to instruction dispatch to execution units; an execution cycle preferably refers to execution of the instruction; a finish cycle preferably refers to signalling the end of the instruction execution; and a completion cycle preferably refers to the architectural completion of the instruction. More particularly, a finish cycle refers to receipt of data from a main subsystem and available to other functional units, while a completion cycle refers to committing data to be architecturally written back to a register.

As shown in FIG. 2, a basic timing diagram illustrating these five instruction cycles, as applied to a four-dispatch type of processor, is shown. By way of example, a fetch cycle occurs for instruction set 1, comprising instructions "A", "B", "C", and "D", in cycle 0, while a fetch cycle for instruction set 2, comprising instructions "E", "F", "G", and "H", occurs in cycle 1. Also during cycle 1, a dispatch cycle occurs for instruction set 1. During cycle 2, instruction set 2's dispatch cycle occurs, while an execution cycle for instruction set 1 occurs.

During cycle 3, another execution cycle occurs for instructions "B", and "C", of instruction set 1, since these instructions are two-cycle instructions. For the powerPC 620, two examples of two-cycle instructions are load instructions and store instructions. Cycle 3 is also a finish cycle for instructions "A" and "D" of instruction set 1. For instruction set 2, instructions "E" and "F" are also two-cycle instructions, so cycle 3 is a first execution cycle for these instructions.

For instructions "A" and "D", cycle 4 is a completion cycle, and a finish cycle for instructions "B" and "C". Further, cycle 4 is an execution cycle for instruction set 2. Cycle 5 is then a finish cycle for instruction set 2, and is a completion cycle for instructions "B" and "C". Cycle 6 concludes the diagram as a completion cycle for instruction set 2.

As illustrated by this diagram, dispatches occur variable number of cycles prior to execution. The number of cycles occurring is dependent upon dependencies between instructions and execution latencies in the execution unit, as is well appreciated by those skilled in the art. Accordingly, instructions need to be held in an instruction queue, known as a reservation station, in each execution unit until the execution unit and all the operands for the instructions are available. Similarly, although only a single cycle is shown as occurring between the finish and completion cycles in the diagram of FIG. 2, several cycles may actually occur between the time an instruction finishes execution and the time it can be architecturally completed. Thus, queues are needed to hold instructions awaiting completion. Two such queues in a load/store execution unit are the load queue and the finished store queue. A further queue suitably exists to hold completed stores until the cache is able to accept the data for the store and is preferably known as the completed store queue.

Figure 3:
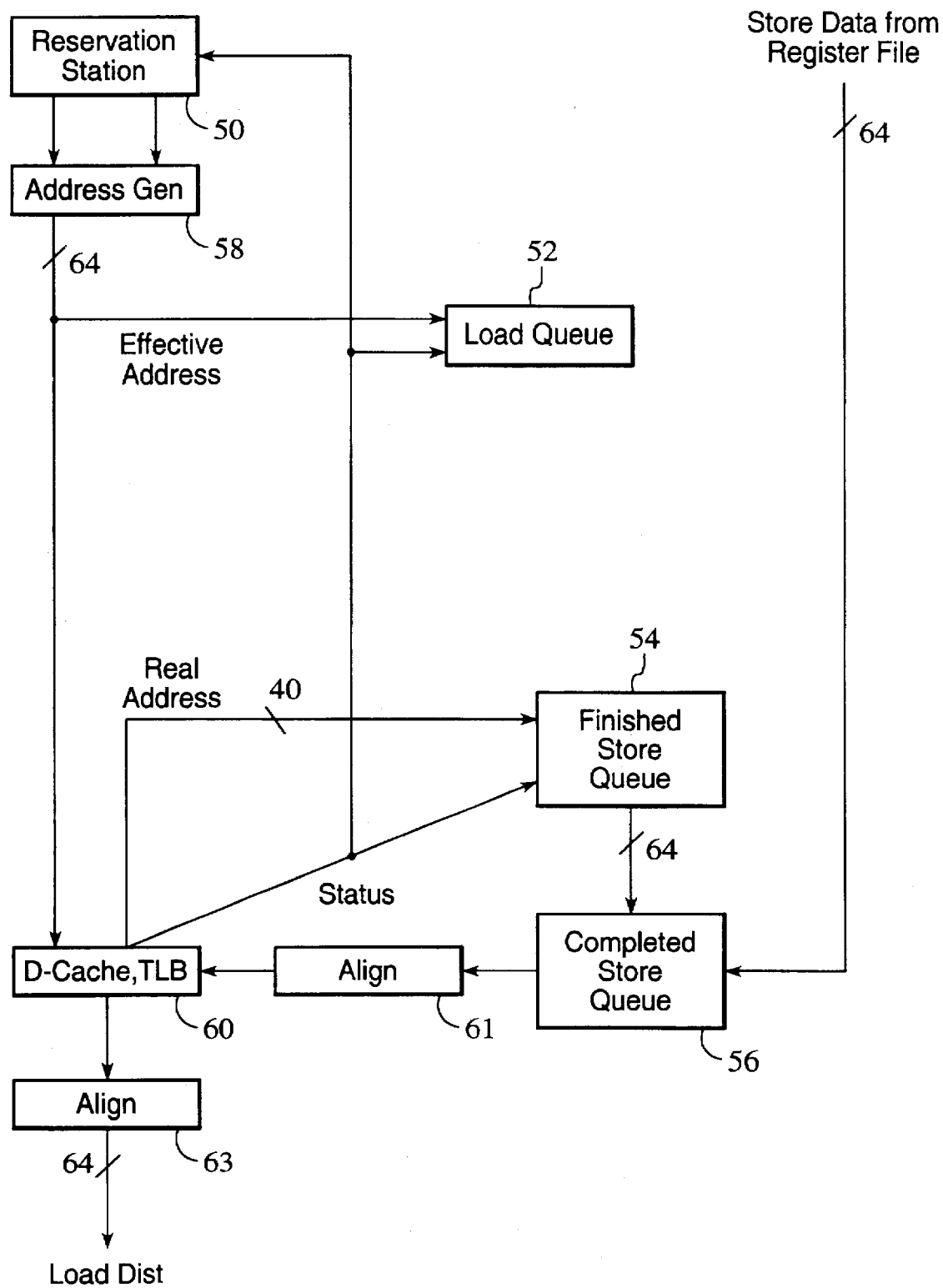
FIG. 3 illustrates a block data flow diagram within a load/store unit of the processor.

FIG. 3 illustrates a block data flow diagram of the relationship among a reservation station 50, a load queue 52, a finished store queue 54 and a completed store queue 56. An address generator 58 generates a 64-bit effective address, from the current instruction in the reservation station 50. The page offset, which is the twelve least significant bits of the effective address, is received by the load queue 52.

A data cache 60 receives all 64 bits of the effective address and generates a real page number that is received by the finished store queue 54, and also generates a plurality of status bits that are received by the finished store queue 54, the load queue 52, and the reservation station 50. The status bits preferably reflect coherency and other cache status information. Other components are illustrated in the diagram, including align units 61 and 63, the details of the functions of which are well understood by those skilled in the art and are not included in the present discussion.

These queues 52, 54, and 56 in the load/store unit preferably handle situations in which load or store instructions bypass other load or store instructions. For example, FIG. 4 represents a sequence of instructions, the memory addresses they access, and the cycle in which they can be completed. Limitations exist on completion of load instructions in the same cycle as completions of store instructions due to the nature of detecting bypass errors. Typically, a bypass error is detected when a store instruction is committed to the data cache 60, i.e., when the store instruction is architecturally completed. A store is normally available to be architecturally completed when it has received a valid translated address from the data cache and the store and all instructions earlier in the program order do not have any outstanding, pending exceptions. The store instruction is then completed once it is the oldest instruction in the machine and it has queued the data to be stored and the related address to be sent to the cache.

By way of example, the store instruction that sits as the second instruction in the list of FIG. 4 limits which instructions can be completed in cycle 1. As shown, the add instruction (instruction #3) is suitably capable of being completed in the same cycle. However, because it is not known until the store instruction #2 is architecturally completed whether there is a bypass condition for any of the subsequent load instructions, the remaining loads cannot be completed in the same cycle.

A comparison is usually performed between the page offset of the load instruction and the page offsets of the store instructions in the finished store queue 54 and the completed store queue 56. When a match exists, program order is checked. When the load is scheduled to occur after the store instruction, the load instruction is marked as invalid to the data cache 60 and kept from executing, thus returning to the reservation station 50 until the store with the conflict is completed. This functionality guarantees that the only time a load can be detected to be out of order with respect to a store is when it executes before the store executes. Many cycles may occur between the execution of a store and the completion of the store, therefore waiting to detect a bypass error until the store completes is costly.

Accordingly, the present invention changes the cycle in which bypass errors are detected to provide the information at a time that is more usable in order to improve the efficiency of the system. Further, the present invention also performs the comparison between the real addresses to a word boundary, of the load and store instructions to more accurately identify potential bypass errors.

In the present invention, the bypass condition is detected at the time of execution of a store instruction. Since all instructions are dispatched to their functional units in program order, the reservation station 50 of the load/store unit holds all the load and store instructions at the time a store starts executing. Further, all the load instructions that have executed are queued in the load queue 52' (FIG. 6) for detecting the bypass condition and are available to be compared against until the load has completed and its data transferred into the register file. Thus, a comparison is readily performed between an executing store and all the load instructions at the time of executing the store instruction. When a bypass condition is detected, the bypass condition is returned to the completion logic (e.g., completion unit 48, FIG. 1) when the store finishes executing. Additionally, when a bypass condition is detected, an instruction identifier for the load that executed out-of-order and received incorrect data is sent to the completion logic the cycle following the store instruction execution. Thus, the completion logic knows early enough to allow completion of instructions up to the next store if there was no bypass condition detected for the current store. Further, when a bypass condition does exist, the completion logic knows which particular load instruction needs to be re-executed from the instruction identifier and can complete instructions up to the load identified with the bypass condition. Such identification further enhances performance by eliminating unnecessary re-execution.

By way of example, FIG. 5 illustrates an example of performance improvement achieved with the present invention. As shown, by detecting bypass conditions at the execution point of a store instruction, e.g., instruction #2, all of the subsequent instructions can be completed in the same cycle as the store instruction, i.e., cycle one, until the occurrence of a load instruction, instruction #9, with a bypass condition. Since instruction #9 accesses the same memory address as the store instruction #6, the indication of a bypass condition is sent to the completion logic with the store (instruction #6), as well as the instruction identifier for the load instruction, instruction #9. Thus, the instructions up to instruction #9 can be completed in the same cycle without risk of loads getting incorrect data from the cache.

It should be appreciated that although eight instructions are shown as completing in the same cycle, the individual characteristics of the processor system, including the size of the completion window, and the number of load instructions causing a bypass error determine how many instructions may be completed in the same cycle, as is well appreciated by those skilled in the art.

Figure 6:
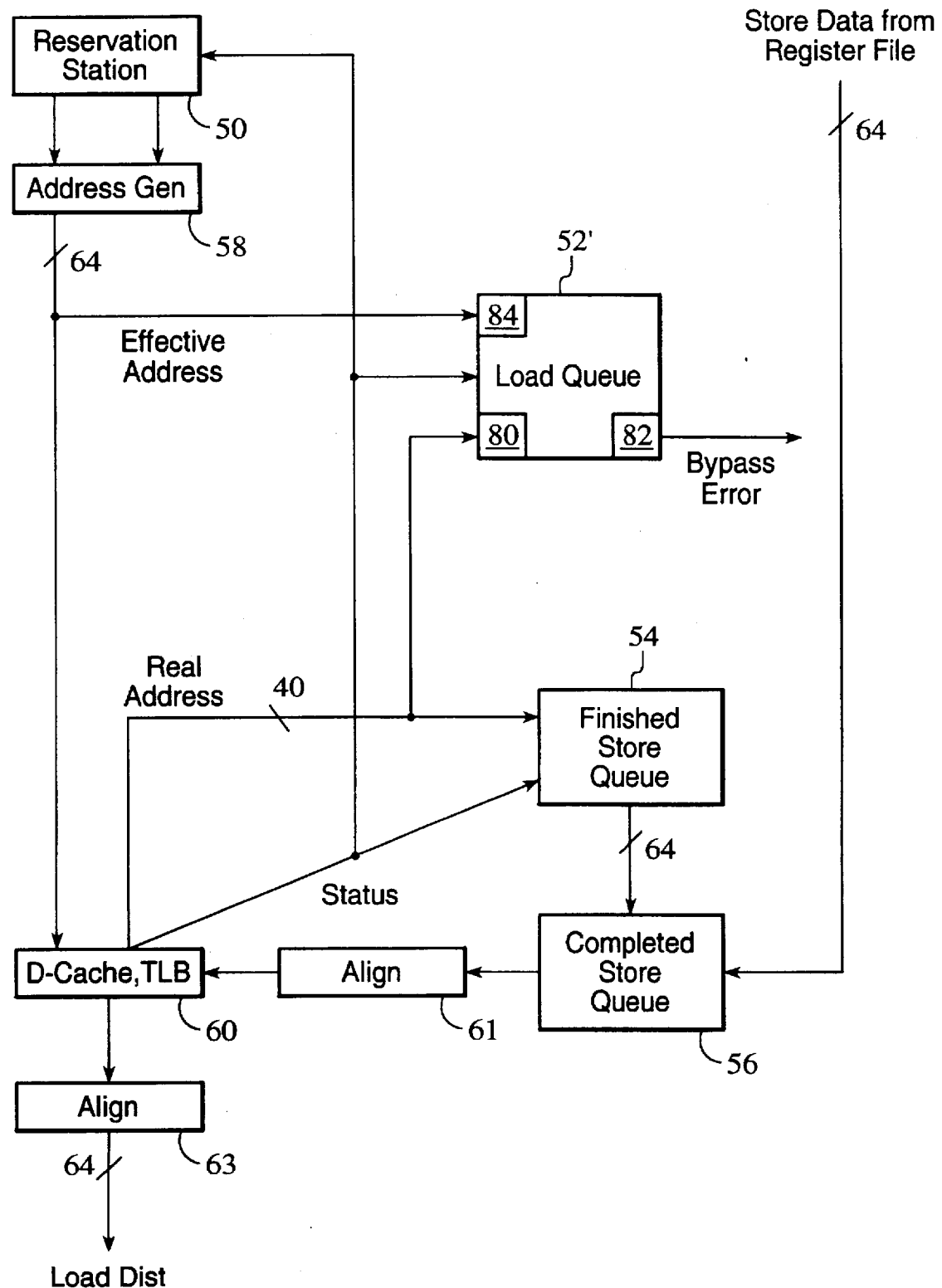
FIG. 6 illustrates a modified block data flow diagram within a load/store unit of the processor in accordance with the present invention.

FIG. 6 illustrates a modified load/store unit diagram from FIG. 3 in accordance with the present invention that improves performance by reducing the number of times load instructions could get false data from the cache and reduces the impact on the execution time when a load instruction does receive incorrect data. Further, these advantages result from the load/store unit providing earlier detection of the bypass condition for a load bypassing a store instruction.

As shown in FIG. 6, the load queue 52' receives the real address of a load instruction into a real address buffer 80 from the data cache 60. Detection logic 82 then capably handles performance of comparisons between the real address of an executing store instruction with the pending loads, as well as determinations of program order of the instructions. When a bypass error is identified, a bypass error signal occurs. As stated above, the bypass error signal is sent to the completion logic with the store instruction being bypassed along with the instruction identifier (also stored in the load queue 52' in an instruction identification buffer 84) for the load instruction with the bypass error condition, so that re-execution of the load is suitably and efficiently achieved.

The present invention thus offers an efficient and accurate system for identifying bypass conditions for load instructions executing out-of-order with respect to store instructions. Further, the inclusion of the identification of the bypass condition at the time of the execution of the store instruction along with the instruction identifier of the load instruction with the bypass condition improves the completion logic's ability to complete other instructions in the same cycle as the store instruction. Data correctness is accurately maintained in a straightforward manner.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

We claim:

1. A method for detecting a bypass error condition for a load instruction executing out-of-order with respect to a store instruction in a load/store unit of a superscalar processor, the method comprising the steps of:

determining whether a load instruction has executed out-of-order with respect to an executing store instruction when a real address to a word boundary of the load instruction and a real address to a word boundary of the executing store instruction match;

identifying a bypass error condition for the load instruction to maintain data correctness for the load instruction when the load instruction has executed out-of-order with respect to the executing store instruction; and signalling to a completion unit the bypass error condition with a bypass error signal sent with the executing store instruction.

2. The method of claim 1 wherein the step of determining further comprises determining a program order for the load instruction and the executing store instruction.

3. The method of claim 1 wherein the step of identifying further comprises identifying an instruction identifier of the load instruction.

4. The method of claim 3 wherein the instruction identifier is received by the completion unit.

5. The method of claim 2 wherein the load instruction with the bypass condition is re-executed.

6. A system for detecting bypass error conditions in a load/store unit of a superscalar processor, the system comprising:

a load queue, the load queue including a real page number buffer for storing a real address to a word boundary for each load instruction in the load queue;

detection logic coupled to the load queue, the detection logic comparing a real address to a word boundary for a load instruction in the load queue against a real address to a word boundary of an executing store instruction and comparing a program order of the load instruction and the executing store instruction when the real addresses to a word boundary match; and completion logic coupled to the load/store unit, the completion logic receiving the executing store instruction together with a bypass error signal when the load instruction has executed out-of-order with respect to the executing store instruction.

7. The system of claim 6 wherein the completion logic further receives an instruction identifier for the load instruction.

8. The system of claim 7 wherein the completion logic further completes instructions up to the identified load instruction.

9. The system of claim 8 wherein the identified load instruction is cancelled, refetched and rescheduled to the load/store unit.

10. The system of claim 6 further comprising a data cache, the data cache supplying the real address to the real page number buffer of the load queue.

* * * * *